United States Patent
Smyth et al.

(10) Patent No.: US 9,986,672 B2
(45) Date of Patent: Jun. 5, 2018

(54) LAND ROLLER

(71) Applicant: Smyth Welding & Machine Shop Ltd., Auburn (CA)

(72) Inventors: Barry W. Smyth, Lucknow (CA); Matthew D. Thomson, Goderich (CA)

( * ) Notice: Subject to any disclaimer, the term of this patent is extended or adjusted under 35 U.S.C. 154(b) by 0 days. days.

(21) Appl. No.: 15/452,372

(22) Filed: Mar. 7, 2017

(65) Prior Publication Data

US 2017/0257996 A1 Sep. 14, 2017

Related U.S. Application Data

(60) Provisional application No. 62/305,156, filed on Mar. 8, 2016.

(51) Int. Cl.
| | |
|---|---|
| *A01B 29/06* | (2006.01) |
| *A01B 73/02* | (2006.01) |
| *A01B 29/02* | (2006.01) |
| *A01B 73/04* | (2006.01) |
| *A01B 63/22* | (2006.01) |

(52) U.S. Cl.
CPC .............. *A01B 29/02* (2013.01); *A01B 29/06* (2013.01); *A01B 63/22* (2013.01); *A01B 73/02* (2013.01); *A01B 73/04* (2013.01); *A01B 73/044* (2013.01)

(58) Field of Classification Search
CPC ......... A01B 29/00; A01B 29/06; A01B 73/02; A01B 73/04
USPC ........................................................ 172/242
See application file for complete search history.

(56) References Cited

U.S. PATENT DOCUMENTS

| | | | | |
|---|---|---|---|---|
| 2,299,859 | A * | 10/1942 | Speiser ................ | A01D 75/306 172/257 |
| 4,896,732 | A | 1/1990 | Stark | |
| 6,393,814 | B1 * | 5/2002 | Gorey .................. | A01B 45/026 56/229 |
| 7,021,397 | B2 | 4/2006 | Pitonyak et al. | |
| 7,640,719 | B2 * | 1/2010 | Boyko ................. | A01B 73/044 56/13.6 |
| 2008/0314605 | A1 * | 12/2008 | Degelman .............. | A01B 29/02 172/311 |
| 2015/0020718 | A1 * | 1/2015 | Pitonyak ................ | A01B 19/04 111/69 |

FOREIGN PATENT DOCUMENTS

| | | |
|---|---|---|
| CA | 2883187 A1 | 4/2015 |
| EP | 2055164 A1 | 5/2009 |
| FR | 2483731 | 4/1979 |
| WO | WO8607522 A1 | 12/1986 |

* cited by examiner

*Primary Examiner* — Gary S Hartmann
(74) *Attorney, Agent, or Firm* — Brunet & Co. Ltd; Robert A. H. Brunet; Hans Koenig

(57) ABSTRACT

A land roller is provided with an over-center locking linkage arrangement to help lock a roller frame of the land roller into a raised transport configuration to reduce the likelihood that a failure of the actuator system could cause the roller frame to inadvertently fall and injure a person or cause damage to property. The land roller may be further provided with actuators that are controlled in temporal series from a single controller to simplify and increase the safety of both converting the land roller between the transport configuration and a working configuration and converting side frame sections of the land roller between folded and unfolded positions.

16 Claims, 15 Drawing Sheets

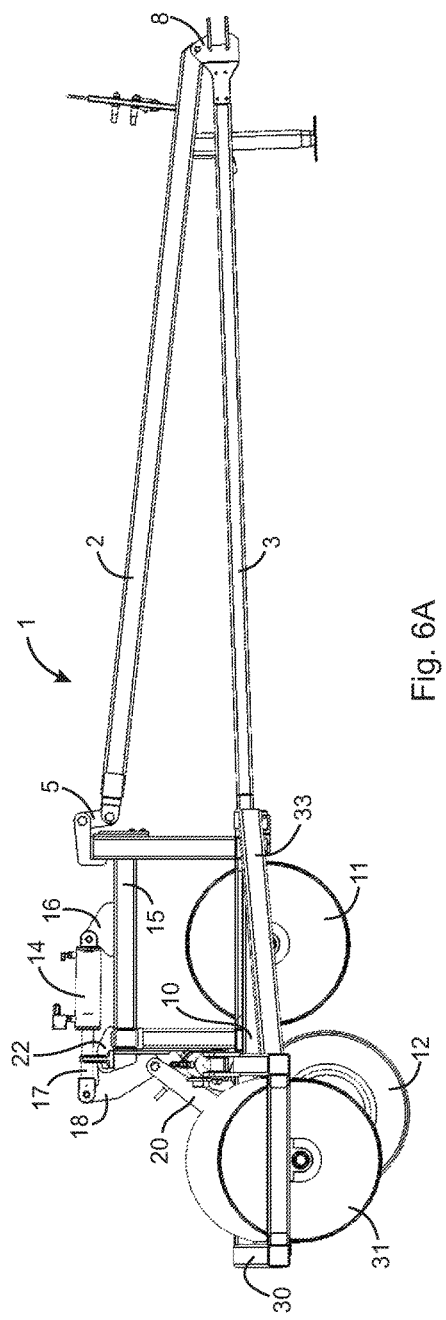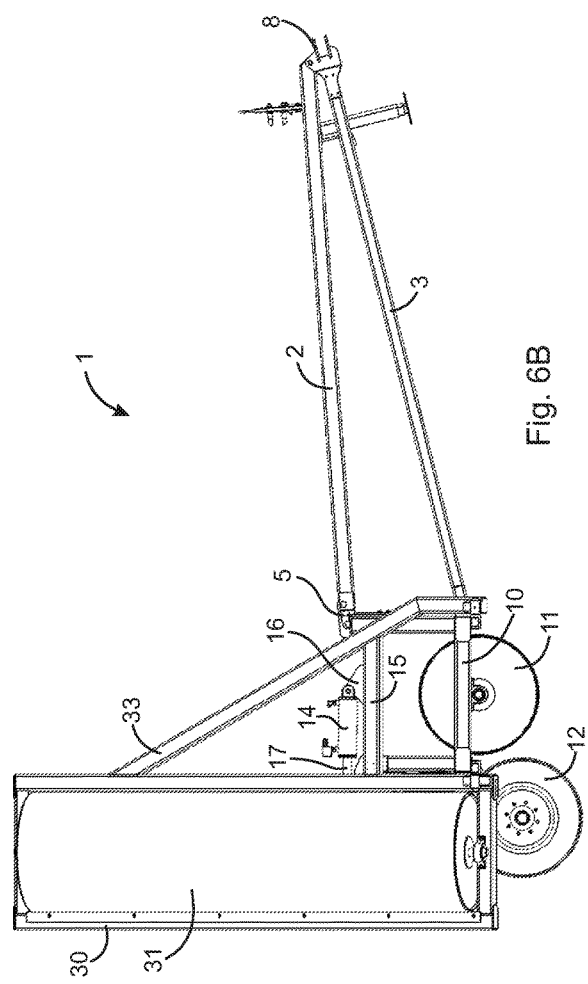

LAND ROLLER

CROSS-REFERENCE TO RELATED APPLICATIONS

This application claims the benefit of U.S. Patent Application No. 62/305,156 filed Mar. 8, 2016, the entire contents of which are incorporated herein by reference.

FIELD

This application relates to soil working implements, more particularly to an implement for rolling land.

BACKGROUND

Land rollers are implements used to level land to facilitate further working of the land, particularly for seed bed preparation in agriculture. Land rollers generally have large heavy cylindrical rollers whose central axes are oriented substantially horizontally with respect to the ground and substantially transversely with respect to the direction of travel of the implement when the implement is in a working configuration. The circumferential surfaces of the rollers engage the ground as the rollers roll over the ground to flatten the soil and level the ground.

Land rollers are also generally equipped with transport wheels to permit towing of the implement on a road to transport the implement between sites. During towing, the implement is in a transport configuration where the wheels are on the ground and the rollers are raised off the ground. When the implement is in the working configuration, the rollers are on the ground and the wheels are raised off the ground.

Land rollers are often provided with a hydraulic system for pivoting the wheels to convert the implement between the transport configuration and the working configuration. Additionally, land rollers are often constructed with side sections or "wings", which have further hydraulic systems for pivoting the side sections between a substantially horizontally oriented (unfolded) position and a substantially upwardly oriented (folded) position. Upwardly folding the side sections narrows the overall width of the implement to permit the implement to be better towed on a public road.

When the implement is in the transport configuration and/or the side sections are in the folded position, the great weight of the rollers poses a significant safety hazard to people and property in the vicinity of the implement. In the event of a failure of one or more of the hydraulic systems, the rollers may inadvertently fall down into the working configuration or unfold into the unfolded position. Anything caught under the rollers would be crushed, suffering considerable damage. To avoid this problem, land rollers have been equipped with locking mechanisms or other supports so that the hydraulic system is not supporting the entire weight of the rollers. In many implements, the locking mechanisms are simple pins that are manually inserted by an operator. However, should the hydraulic system experience a catastrophic failure while the operator is trying to insert the pins but before the pins are inserted, the roller could fall, causing injury to the operator.

There remains a need for a simpler and safer way of ensuring that rollers remain stable when the implement is in the transport configuration.

SUMMARY

There is provided a land roller comprising: a frame comprising a first frame section mountable on a transport vehicle for towing the land roller and a side frame section pivotally mounted on the first frame section, the side frame section pivotable between an unfolded position and a folded position; a first roller mounted on the first frame section; a second roller mounted on the side frame section; at least one transport wheel pivotally mounted on the first frame section, the at least one transport wheel pivotable between a ground-engaging wheel position and a ground-disengaged wheel position for conversion of the land roller between a transport configuration and a working configuration, the transport configuration having the at least one wheel in the ground-engaging wheel position and the first and second rollers in ground-disengaged roller positions, the working configuration having the at least one wheel in the ground-disengaged wheel position and at least the first roller in a ground-engaging roller position; a first actuator connecting the first frame section to the at least one transport wheel, the first actuator operable to pivot the at least one wheel between the ground-engaging wheel position and the ground-disengaged wheel position; an over-center locking linkage arrangement connected between the first actuator and the at least one wheel, the first actuator configured to transmit force through the over-center locking linkage arrangement to the at least one transport wheel to pivot the at least one wheel; and, a second actuator connecting the first frame section to the side frame section, the second actuator operable to pivot the side frame section between the unfolded and folded positions, the side frame section pivoting about a side-frame pivot axis when pivoting between the unfolded and folded positions, the second actuator connected to the side frame section at a connection point on the side frame section, the connection point disposed outward of the side-frame pivot axis when the side frame section is in the unfolded positon and inward of the side-frame pivot axis when the side frame section is in the folded position.

There is also provided a land roller comprising: a frame; a roller mounted on the frame; a longitudinally extending tongue configured to be mounted on a transport vehicle; and, at least one shock absorber mounted between the tongue and the frame.

The frame has a longitudinal axis in the direction of motion of the land roller as the land roller is being towed. The longitudinal axis runs from front to rear (or rear to front) of the frame. The cultivator frame has a transverse axis that is perpendicular to the longitudinal axis and runs left to right (or right to left) of the frame. The front end of the frame is mounted to a transport vehicle (e.g. a tractor or a truck) that tows the land roller. The frame may have longitudinally spaced apart transverse frame members and transversely spaced apart longitudinal frame members. The rollers are generally mounted on one or more of the frame members so that circumferential surfaces of the rollers engage the ground as the rollers roll over the ground to flatten the soil and level the ground when the land roller is in the working configuration. In one embodiment, the land roller may comprise two side frame sections, one disposed on a left side of a longitudinal center line through the first frame section and one disposed on a right side of the longitudinal center line through the first frame section.

The over-center locking linkage arrangement in connection with the first actuator and the at least one wheel provides for improved operational simplicity and safety, helping to lock the frame into an elevated transport configuration to reduce the likelihood that a failure of the first actuator could cause the frame to inadvertently fall and injure a person or cause damage to property while the land roller is in the transport configuration. Further, the over-center locking linkage arrangement in conjunction with an inward of center folded position for the side frame section and an actuator system where the first and second actuators are linked to permit an operator to raise the land roller and lock it in the elevated transport position, followed by folding the side frame section and locking the wings in an upright inward of center folded position all via operation of a single controller. Unfolding the side frame section followed lowering the land roller into the working configuration may be likewise controlled from the same single controller.

Prior implements often required separate controllers for raising the implement and folding the wings, and often required use of locking pins both to secure the implement in the elevated position and to secure the wings in the folded position. The operator was therefore required to operate the two controllers in a specific order to avoid potentially unstable conditions that could occur if the wings were folded prior to raising the implement thereby exposing the operator to potential hazards during manual insertion of the locking pins. The present invention simplifies raising and folding for safe transport between sites in a locked transport configuration.

In one embodiment, the over-center locking linkage arrangement may comprise a first linkage and a second linkage. The first linkage may be pivotally connected to the first actuator at a first pivot point. The first linkage may be pivotally connected to the second linkage at a second pivot point. The first linkage may be pivotally connected to the first frame section at a third pivot point disposed between the first and second pivot points. The second linkage may be pivotally linked to a wheel lifting structure at a fourth pivot point. The second pivot point may be to one side of a line between the first and fourth pivot points when the land roller is in the transport configuration. The second pivot point may be to the other side of the line between the first and fourth pivot points when the land roller is in the working configuration. Whether the second pivot is forward or rearward of the line when the land roller is in the transport configuration depends on the overall arrangement of the over-center locking linkage arrangement. The second pivot point is preferably forward of the line when the land roller is in the transport configuration.

An edge of the first linkage proximate the second pivot point may form an acute angle at the second pivot point with an edge of the second linkage proximate the second pivot point when the land roller is in the transport configuration. The edge of the first linkage and the edge of the second linkage may form an obtuse angle at the second pivot point when the land roller is in the working configuration. The edges of the first and second linkages that form the angle may be posterior or anterior edges depending on the overall arrangement of the over-center locking linkage arrangement, but the edges are preferably posterior edges.

In one embodiment, the first linkage may be pivotally connected to the first frame section at a bracket rigidly mounted to the first frame section to prevent the third pivot point from translating when the first and second linkages pivot. In one embodiment, the second pivot point may translate in an arcuate path about the third pivot point in response to operation of the first actuator. The third pivot point may represent a center of rotation about which the second pivot point rotates. The point during operation of the first actuator when the linkage arrangement passes over center may occur when the second pivot point is collinear with the first and fourth pivot points. In some embodiments, the edges of the first and second linkages may be collinear or parallel at the over center point.

In one embodiment, the at least one wheel may be mounted the wheel lifting structure. In one embodiment, the wheel lifting structure may be a transversely oriented axle bar. An axis of rotation of the at least one wheel may be parallel to but spatially offset from a rotation axis of the axle bar. The axle bar may be connected to the second linkage. The axle bar may rotate in response to movement of the second linkage to pivot the at least one wheel between the ground-engaging wheel position and the ground-disengaged wheel position. The second linkage may be movable in response to movement of the first linkage. The first linkage may be moveable in response to operation of the first actuator. In one embodiment, the second linkage may be connected to the axle bar by a third linkage. The third linkage may be pivotally connected to the second linkage and rigidly connected to the axle bar. In one embodiment, the at least one wheel may comprise two transversely spaced-apart wheels.

In one embodiment, the first and second actuators may be controlled by a single controller. The first and second actuators may be configured to actuate in temporal series when signaled by the controller to actuate. In one embodiment, the first actuator may pivot the at least one wheel to the ground-engaging wheel position, followed by the second actuator pivoting the side frame section to the folded position to convert the land roller to the transport configuration from the working position. In one embodiment, the second actuator may pivot the side frame section to the unfolded position, followed by the first actuator pivoting the at least one wheel to the ground-disengaged wheel position to convert the land roller to the working configuration from the transport configuration.

The first and/or second actuators may be any suitable device, for example electric actuators (e.g. linear actuators), hydraulic cylinders (e.g. dual acting hydraulic cylinders) and the like. In one embodiment, the first actuator, second actuator or both the first and second actuators may comprise hydraulic cylinders. The first and second actuators may comprise hydraulic cylinders operated from a common hydraulic fluid reservoir through a common hydraulic circuit. The common hydraulic circuit may comprise a pressure relief circuit in fluid communication with the first and second actuators. The pressure relief circuit may prevent hydraulic fluid from flowing into the first actuator when the second actuator is pivoting the side frame section to the unfolded position when hydraulic fluid pressure in the common hydraulic circuit is less than a pre-determined value. The pressure relief circuit may permit hydraulic fluid to flow into the first actuator when hydraulic fluid pressure in the common hydraulic circuit reaches or exceeds the pre-determined value. In one embodiment, when the second actuator is finished pivoting the side frame section, pressure in the common hydraulic circuit may spike triggering opening of a hydraulic fluid path to the first actuator.

The second actuator is connected to the side frame section at a connection point on the side frame section, the connection point disposed outward of the side-frame pivot axis when the side frame section is in the unfolded position and inward of the side-frame pivot axis when the side frame section is in the folded position. Such an arrangement permits the center of gravity of the side frame section to be over the first frame section when the side frame section is in the folded position, while permitting the center of gravity of the side frame section to be transversely outward of the first frame section when the side frame section is in the unfolded position. With the side frame section in the folded position when the land roller is in the transport configuration, having the center of gravity of the side frame section over the first frame section provides for a locked and more stable arrangement for transporting the land roller between sites.

In one embodiment, the connection point for the second actuator on the side frame section is configured to permit translation of the actuator within the connection point to permit the side frame section to move relative to the first frame section during operation of the land roller. In one embodiment, the connection point for the second actuator on the side frame section may comprise a pin in an elongated slot to permit translation of the actuator within the connection point to permit the side frame section to move relative to the first frame section during operation of the land roller.

In another embodiment, at least one shock absorber may be mounted between a tongue and a frame, particularly a center frame section, of the land roller. The tongue may comprise one or more longitudinally extending elongated central tow bars. The at least one shock absorber is preferably pivotally mounted to a central tow bar and a vertically oriented frame member of a center frame section of the frame. Preferably, the at least one shock absorber comprises two shock absorbers. The at least one shock absorber is particularly useful to absorb vertical forces while the land roller is towed in the transport position to reduce vertical displacement of the land roller especially when being towed over rough surfaces.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 6A depicts a side view of the land roller of FIG. 1A;
FIG. 6B depicts a side view of the land roller of FIG. 1B.

DETAILED DESCRIPTION

Figure 1A:
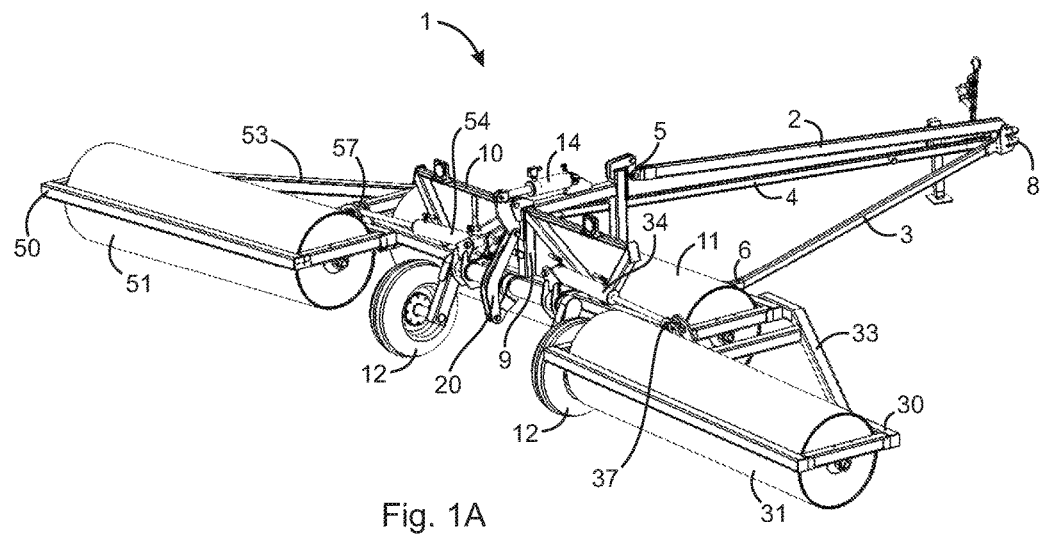
FIG. 1A depicts a rear perspective view of a land roller in accordance with the present invention, where right and left side sections are in unfolded positions.
Figure 1B:
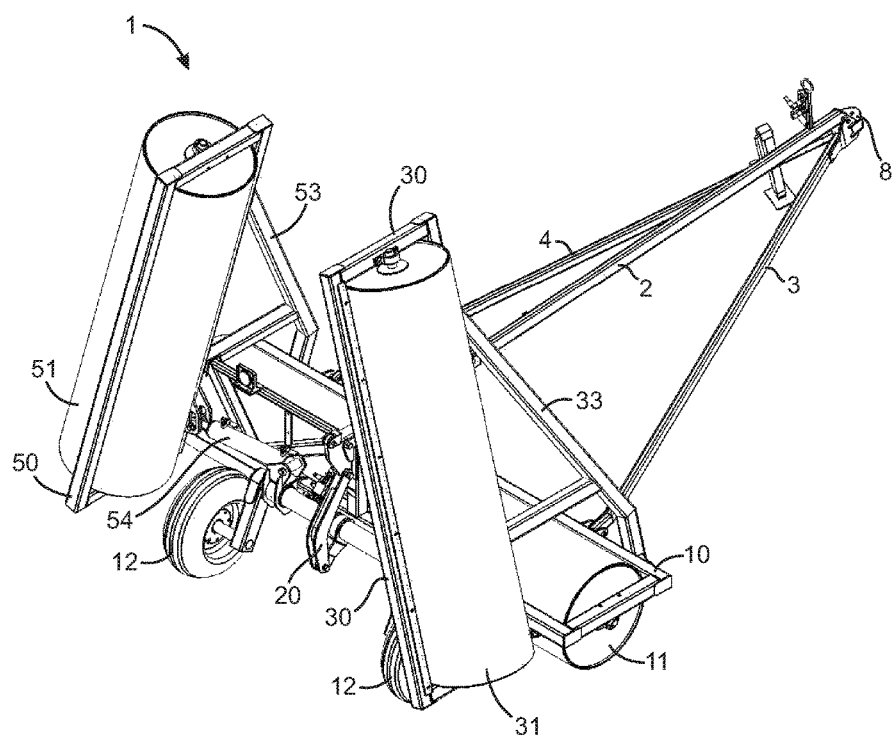
FIG. 1B depicts the land roller of FIG. 1A with the right and left side sections in folded positions.
Figure 2A:
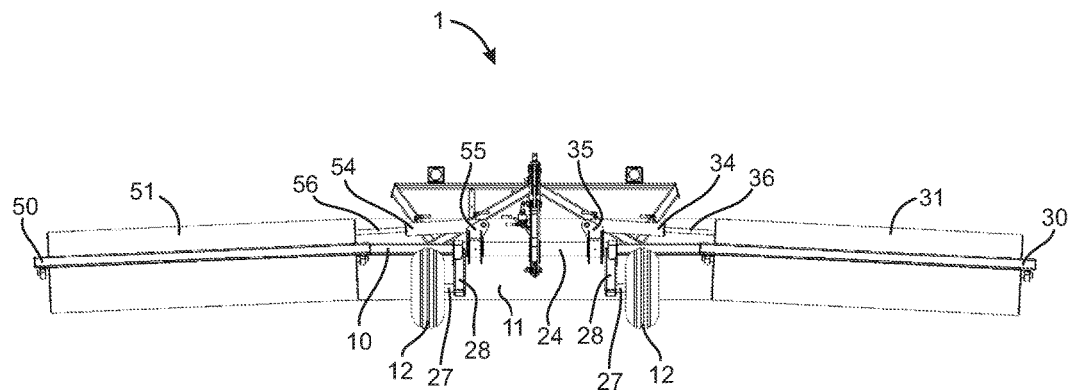
FIG. 2A depicts a rear view of the land roller of FIG. 1A.
Figure 2B:
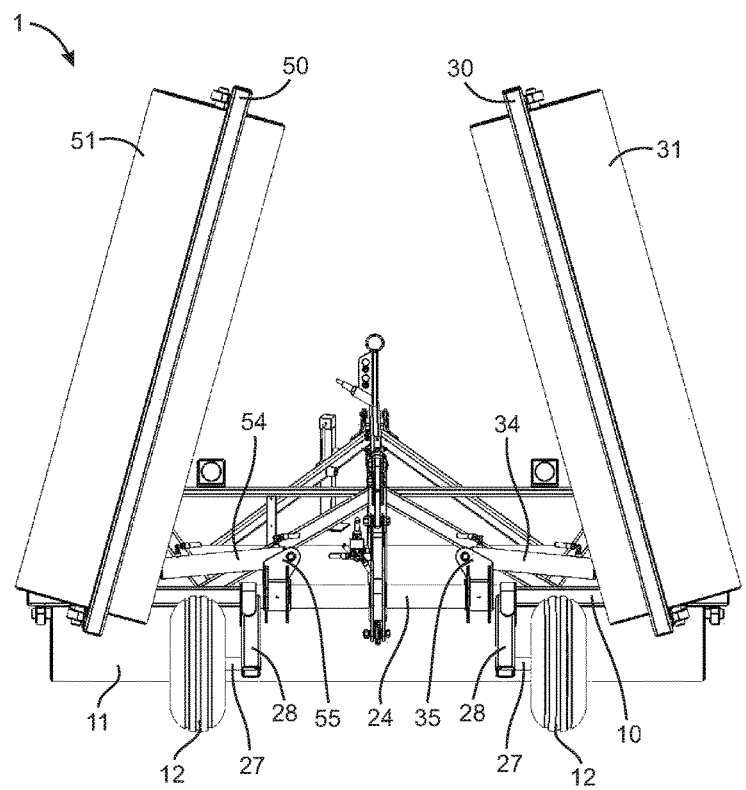
FIG. 2B depicts a rear view of the land roller of FIG. 1B.
Figure 3A:
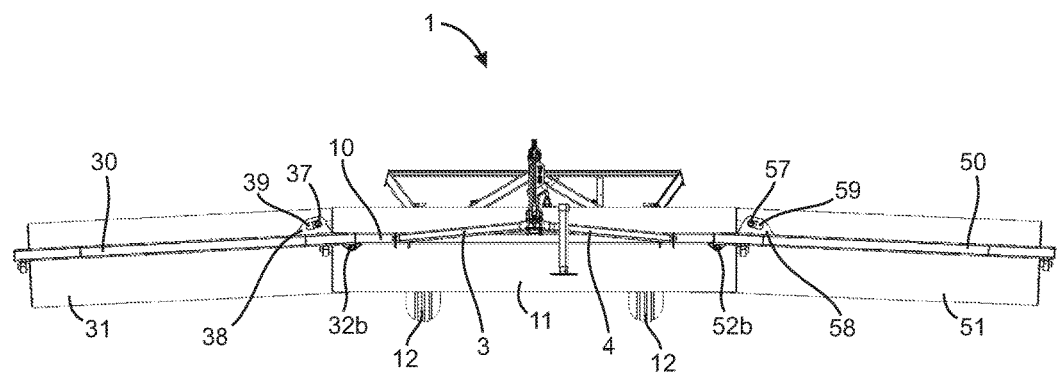
FIG. 3A depicts a front view of the land roller of FIG. 1A.
Figure 3B:
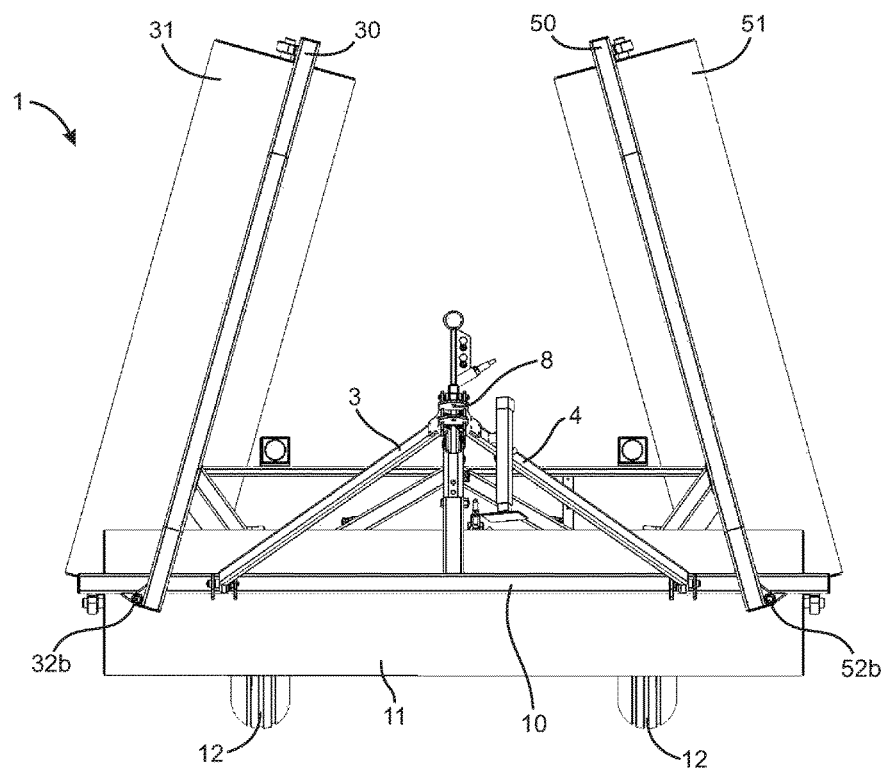
FIG. 3B depicts a front view of the land roller of FIG. 1B.

Referring to the Figures, a land roller 1 comprises a center section having a center frame 10, a right side section having a right side frame 30 and a left side section having a left side frame 50, each of the frames 10, 30, 50 comprising longitudinal and transverse elongated frame members on which a center roller 11, a right side roller 31 and a left side roller 51, respectively, are rotatably mounted. Generally longitudinally extending elongated tow bars 2, 3, 4 may be pivotally connected to the center frame 10 at tow bar pivot mounts 5, 6, 7, respectively, the tow bars 2, 3, 4 converging to and connected to a hitch 8 at a front end of the land roller 1 where the hitch 8 may be connected to a towing vehicle.

The right side frame 30 may be pivotally mounted on the center frame 10 at right side frame pivot mounts 32a, 32b. The right side frame pivot mounts 32a, 32b may comprise any suitable structure permitting upward and downward pivoting of the right side frame 30 about a right side frame pivot axis R-R, for example pivot pins inserted through corresponding apertures in mounting brackets secured to the right side frame 30 and the center frame 10. The right side frame pivot axis R-R may be parallel to the longitudinal axis of the land roller 1. Upward and downward pivoting of the right side frame 30 permits moving the right side frame 30 between the folded and unfolded positions. The right side frame 30 may be disposed both to the right and behind the center frame 10. In order to provide for the right side frame pivot mounts 32a, 32b at both a rear and front of the center frame 10, an angled right side pivot support frame member 33 may be used to provide a mounting location for one of the right side frame pivot mounts 32b on an opposite side of the center frame 10. Alternatively, the right side frame 30 may be disposed both to the right and in front of the center frame 10. A similar arrangement may be provided for the left side frame 50 involving left side frame pivot mounts 52a, 52b, left side frame pivot axis L-L and angled right side pivot support frame member 53.

Figure 4A:
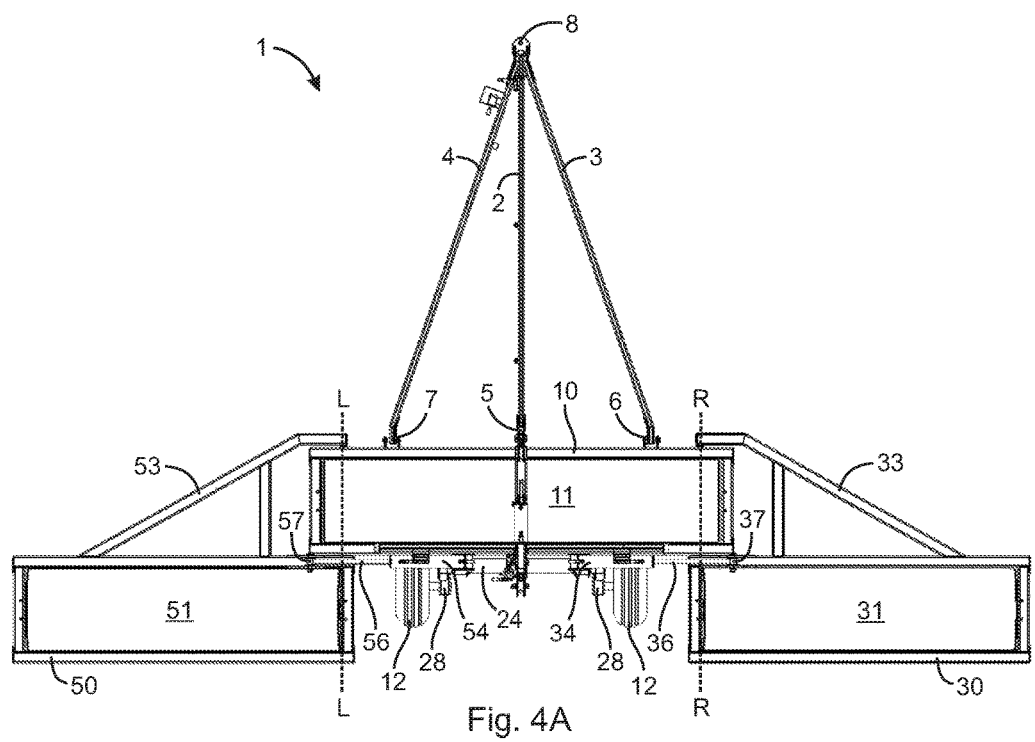
FIG. 4A depicts a top view of the land roller of FIG. 1A.
Figure 4B:
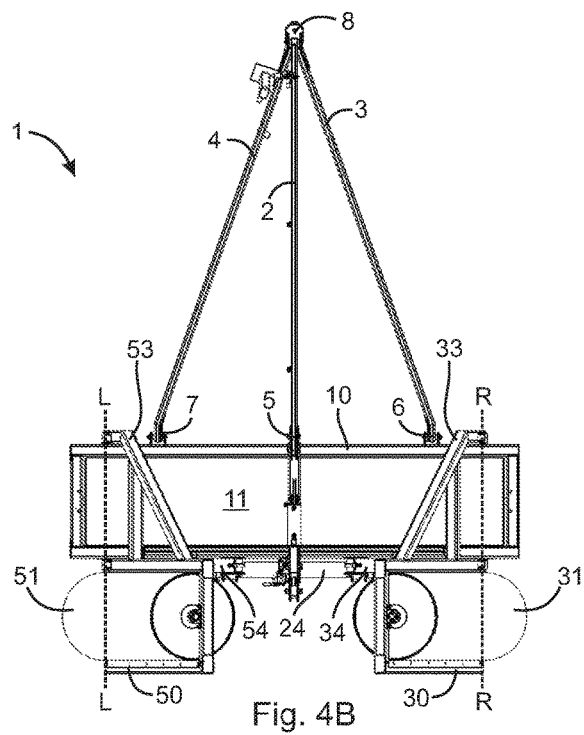
FIG. 4B depicts a top view of the land roller of FIG. 1B.
Figure 5A:
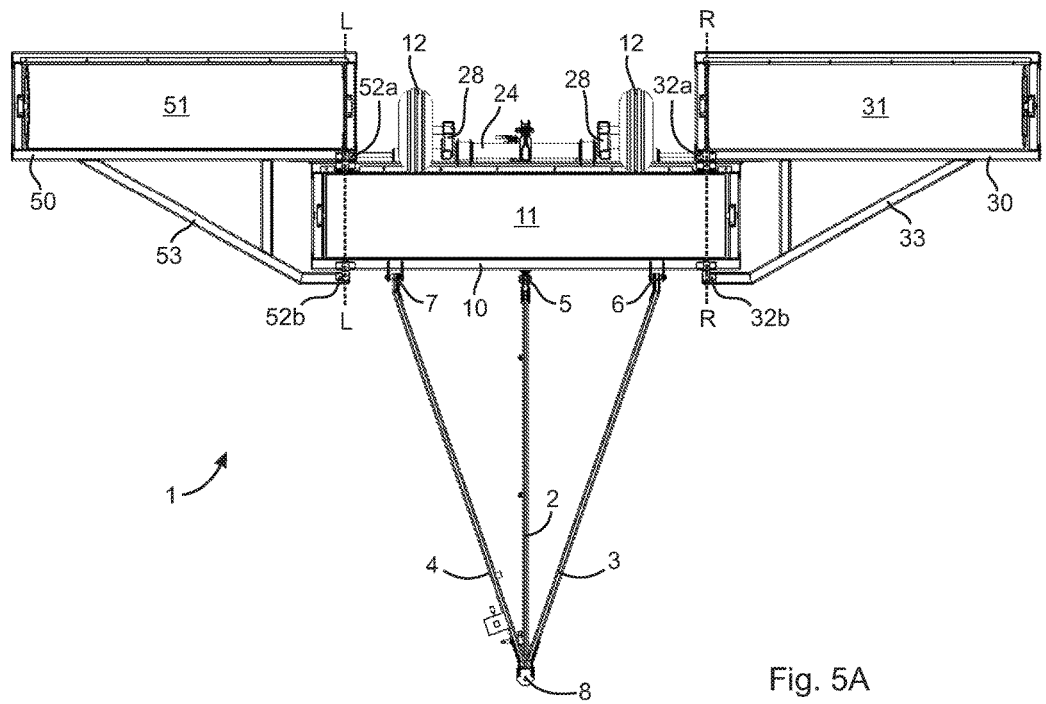
FIG. 5A depicts a bottom view of the land roller of FIG. 1A.
Figure 5B:
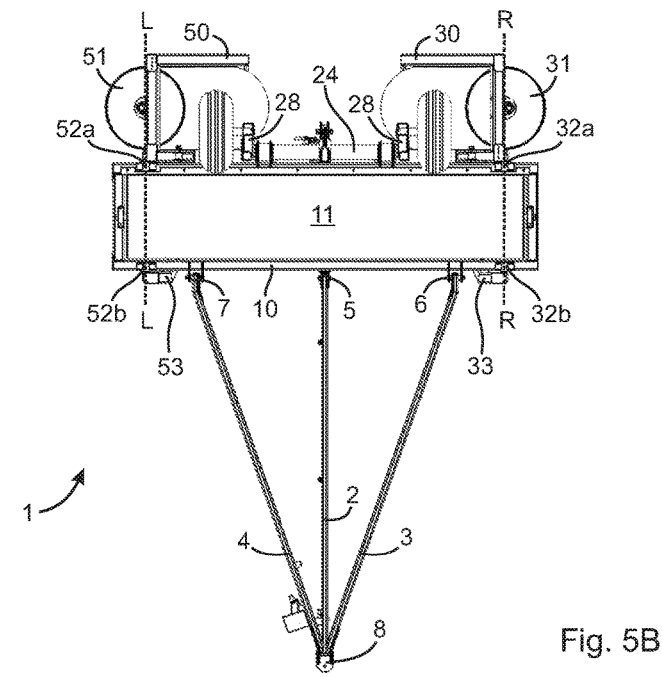
FIG. 5B depicts a bottom view of the land roller of FIG. 1B.
Figure 7A:
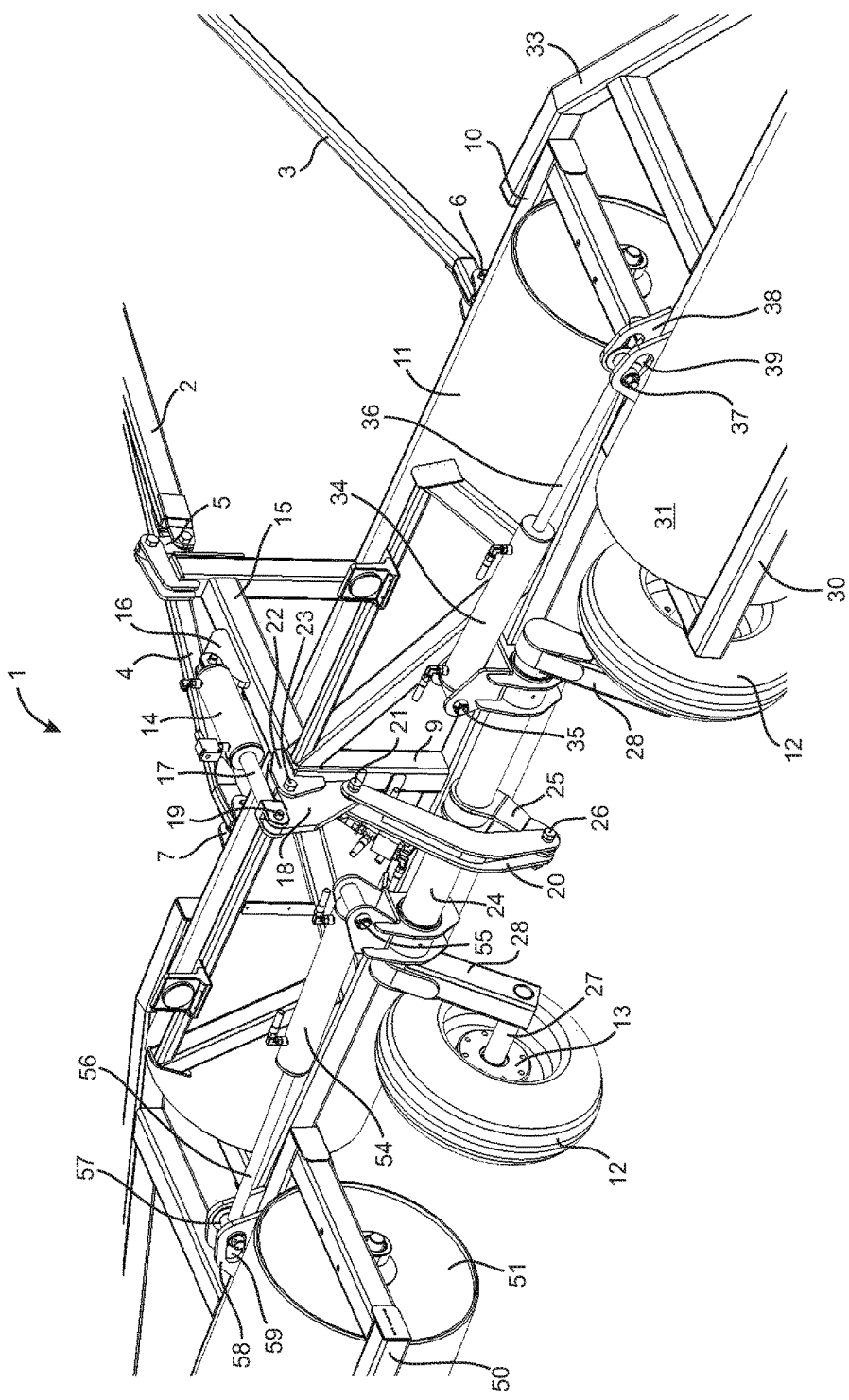
FIG. 7A depicts a magnified rear perspective view of the land roller of FIG. 1A.
Figure 7B:
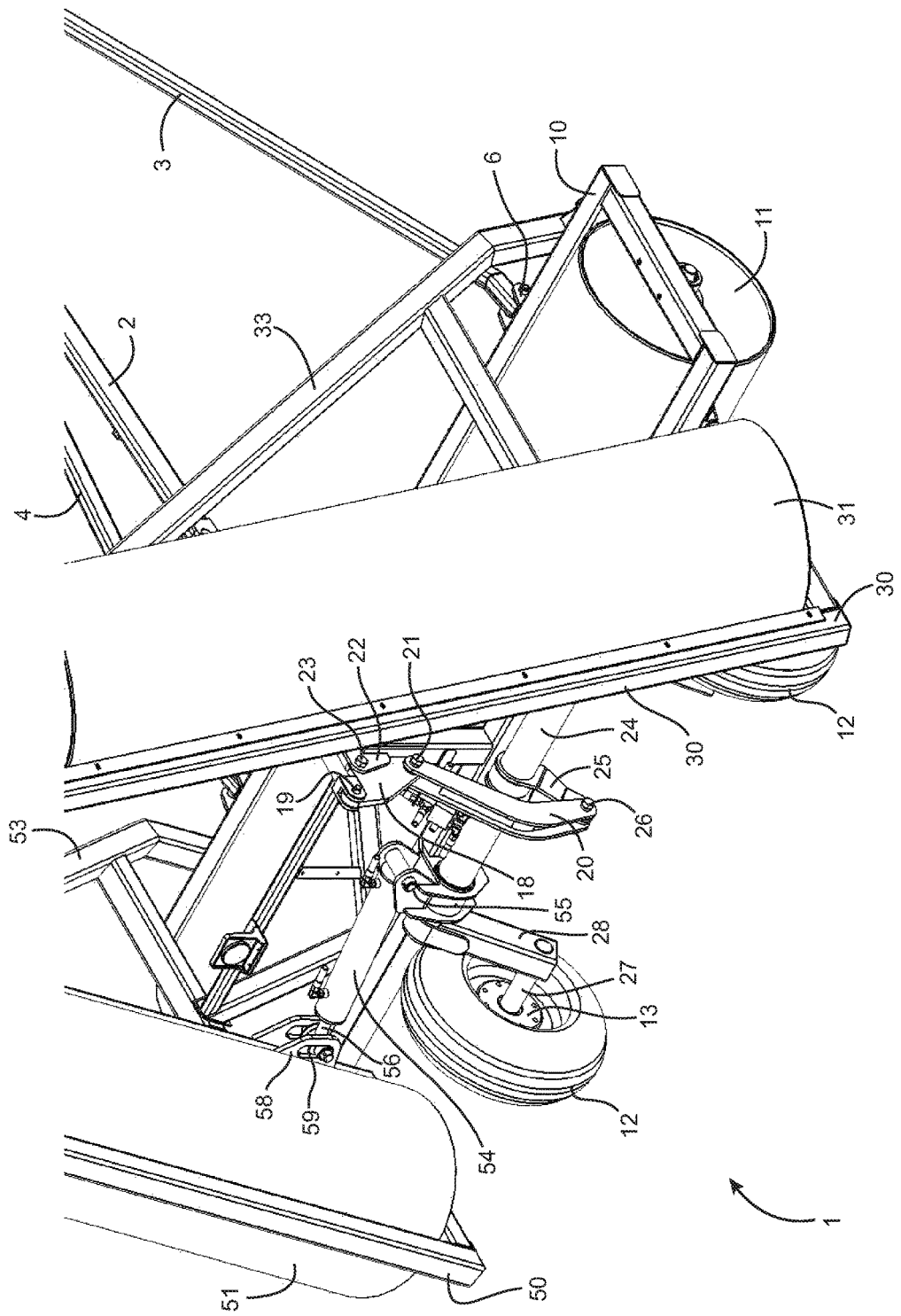
FIG. 7B depicts a magnified rear perspective view of the land roller of FIG. 1B.

To move the right side frame 30 between the folded and unfolded positions, a right side hydraulic cylinder 34 may be connected between the center frame 10 and the right side frame 30. Either a barrel-end or a rod-end of the right side hydraulic cylinder 34 may be mounted on the center frame 10 with the other end mounted on the right side frame 30. In the embodiment shown in the Figures, the barrel-end of the right side hydraulic cylinder 34 is pivotally mounted on the center frame 10 at right side cylinder mount 35 and the rod-end is pivotally mounted on the right side frame 30 at right side cylinder rod mount 37. Retraction of cylinder rod 36 of the right side hydraulic cylinder 34 causes the right side frame 30 to pivot around the right side frame pivot axis R-R thereby raising the right side frame 30 to the folded position. Extension of cylinder rod 36 of the right side hydraulic cylinder 34 causes the right side frame 30 to pivot around the right side frame pivot axis R-R thereby lowering the right side frame 30 to the unfolded position. The right side cylinder rod mount 37 may advantageously comprise a pin in a clevis 38, the clevis 38 having elongated slots 39 within which a mounting pin may translate (see FIG. 7A and FIG. 7B). Translation of the pin in the clevis 38 permits the right side frame 30 to move relative to the center frame 10 during operation of the land roller 1. Further, as especially shown in FIG. 4A and FIG. 4B, when the right side frame 30 is in the unfolded position (FIG. 4A), the right side cylinder rod mount 37 is located transversely outward of the right side frame pivot axis R-R. However, the right side hydraulic cylinder 34 may be configured so that when the right side frame 30 is in the folded position (FIG. 4B), the right side cylinder rod mount 37 is located transversely inward of the right side frame pivot axis R-R. With the right side cylinder rod mount 37 located transversely inward of the right side frame pivot axis R-R, the weight of the right side frame 30 is now over the center frame 10 to be supported on a pair of transport wheels 12 instead of just by the right side hydraulic cylinder 34 when the land roller 1 is in the transport configuration. Therefore, should the right side hydraulic cylinder 34 fail during transport of the land roller 1, the right side frame 30 will not inadvertently crash down to the unfolded position. Therefore, configuring the right side hydraulic cylinder 34 so that the right side cylinder rod mount 37 is located transversely inward of the right side frame pivot axis R-R when the right side frame 30 is in the folded position enhances safety of the land roller 1. A similar arrangement may be provided for the left side frame 50 involving left side hydraulic cylinder 54, left side cylinder mount 55, cylinder rod 56, left side cylinder rod mount 57, clevis 58, elongated slots 39 and left side frame pivot axis L-L.

The pair of transport wheels 12 may be provided to permit efficient transport of the land roller 1 between sites. With particular reference to FIG. 7A, FIG. 7B, FIG. 8A, FIG. 8B, FIG. 8C, FIG. 8D and FIG. 9, to convert the land roller 1 between a transport configuration and a working configuration, the transport wheels 12 may be pivoted upward or downward. When pivoted downward, the wheels 12 eventually reach a ground-engaging position (FIG. 8A) with the rollers 11, 31, 51 in ground-disengaged positions so that the land roller 1 is in the transport configuration. When pivoted upward, the wheels 12 eventually reach a ground-disengaged position with at least the center roller 11 in a ground-engaging position so that the land roller 1 is in the working configuration (FIG. 8D). In the working configuration, the right and left side sections with the right and left side frames 30, 50 are usually in the unfolded position so that the right and left rollers 31, 51 are also in ground-engaging positions.

Under normal operation, the right and left side frames 30, 50 are only folded when the land roller 1 is in the transport configuration; however, it may be possible in some circumstances for the right and left side frames 30, 50 to be in the folded positions when the land roller 1 is in the working configuration, in which case only the center roller 11 would be in the ground-engaging.

Pivoting of the wheels 12 may be accomplished with an implement-elevation hydraulic cylinder 14 mounted on the center frame 10. The implement-elevation hydraulic cylinder 14 may be operatively connected to the wheels 12 by linkages that provide an over-center locking arrangement for the center frame 10 when the land roller 1 is in the transport configuration. An over-center locking arrangement advantageously permits the land roller to be locked in the transport configuration without the use of pins or other securing devices and without relying on hydraulic cylinders to hold the land roller in the transport configuration. Such an over-center locking arrangement therefore reduces the chance that the land roller will inadvertently lower into the working configuration while the land roller is being transported between sites.

In the embodiment illustrated in the Figures, the implement-elevation hydraulic cylinder 14 may be pivotally mounted on a frame member 15 at a center cylinder mount 16. A cylinder rod 17 of the implement-elevation hydraulic cylinder 14 may be pivotally connected to a first linkage 18 at a first pivot point 19, for example with a pivot pin. The first linkage 18 may be pivotally connected to a second linkage 20 at a second pivot point 21, for example with a pivot pin. The first linkage 18 may also be pivotally connected to a mounting plate 22 at a third pivot point 23, for example by a pivot pin. The mounting plate 22 may be rigidly secured to the center frame 10, for example by bolting or welding to a frame member, for example a vertical frame member 9. The third pivot point 23 may be disposed between the first and second pivot points 19, 21. Together, the first linkage 18, second linkage 20 and mounting plate 22 form a linkage assembly. The linkage assembly is generally vertically disposed in relation to the longitudinal axis of the land roller 1. The second linkage 20 may be pivotally connected to a lift axle 24 so that pivoting of the second linkage 20 causes the lift axle 24 to rotate. For example, the second linkage 20 may be pivotally connected to an axle crank 25 by a pivot pin at a fourth pivot point 26, the axle crank 25 being rigidly secured to the lift axle 24. The lift axle 24 may be connected to wheel axles 27 by struts 28 depending at an angle, for example perpendicularly, from a rotation axis of the lift axle 24. The wheels 12 may be mounted on wheel hubs 13, the wheel hubs 13 rotatably mounted on the wheel axles 27. Longitudinal axes of the wheel axles 27 are preferably parallel to and spatially offset from the rotation axis of the lift axle 24. The longitudinal axes of the wheel axles 27 are preferably collinear.

Extension and retraction of the cylinder rod 17 imparts force through the linkage assembly, which causes the lift axle 24 to rotate, rotation of the lift axle 24 causing the struts 28 to pivot thereby lifting or lowering the wheels 12. Correlation between extension and retraction of the cylinder rod 17 and the overall direction of rotation of the lift axle 24 depends on the orientation of the hydraulic cylinder 14. The third pivot point 23 represents a center of rotation about which the linkage assembly rotates as the cylinder rod 17 is extended or retracted.

Figure 8A:
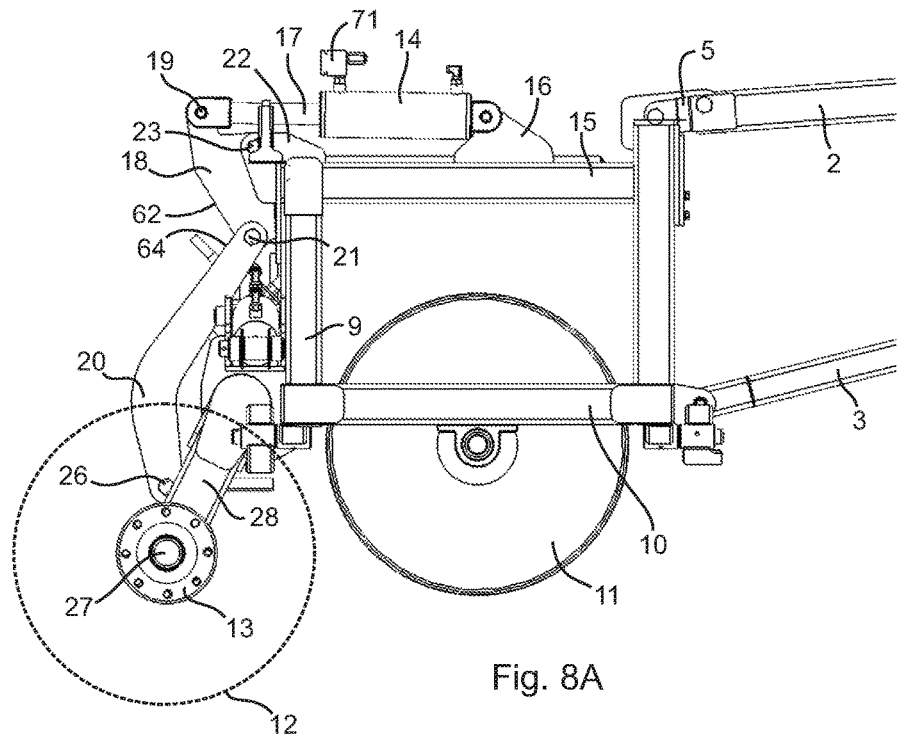
FIG. 8A depicts a magnified side view of the land roller of FIG. 1A without side frames, with an implement-elevation hydraulic cylinder fully extended and the land roller in a transport configuration with wheels in a lowered ground-engaging position and rollers in a raised ground-disengaged position.
Figure 8B:
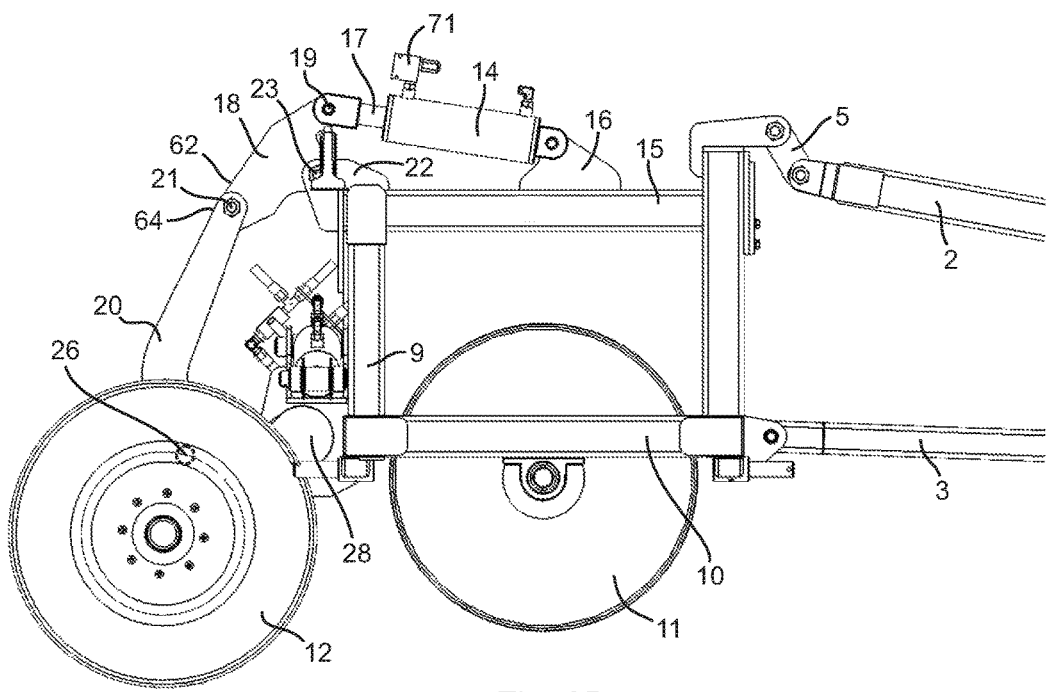
FIG. 8B depicts the land roller of FIG. 8A with the implement-elevation hydraulic cylinder in a first partially retracted position.
Figure 8C:
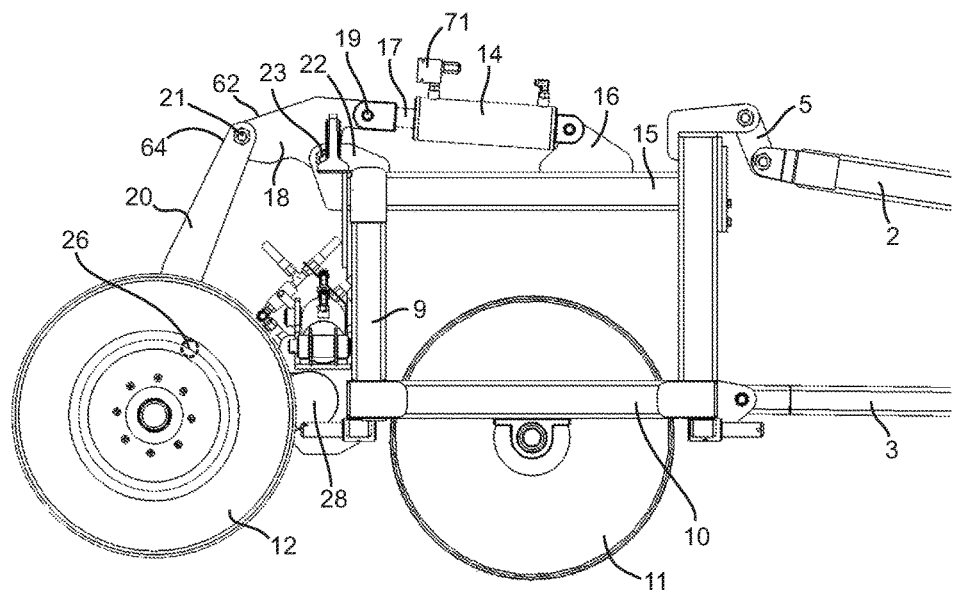
FIG. 8C depicts the land roller of FIG. 8A with the implement-elevation hydraulic cylinder in a second partially retracted position.
Figure 8D:
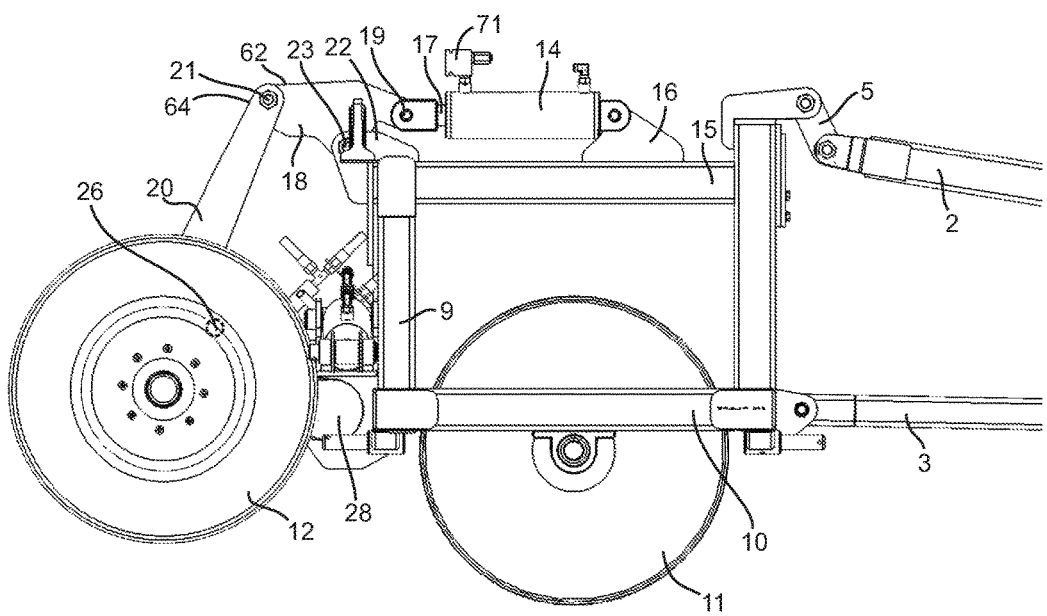
FIG. 8D depicts the land roller of FIG. 8A with the implement-elevation hydraulic cylinder fully retracted and the land roller in a working configuration with the wheels in a raised ground-disengaged position and the rollers in a lowered ground-engaging position.
Figure 9:
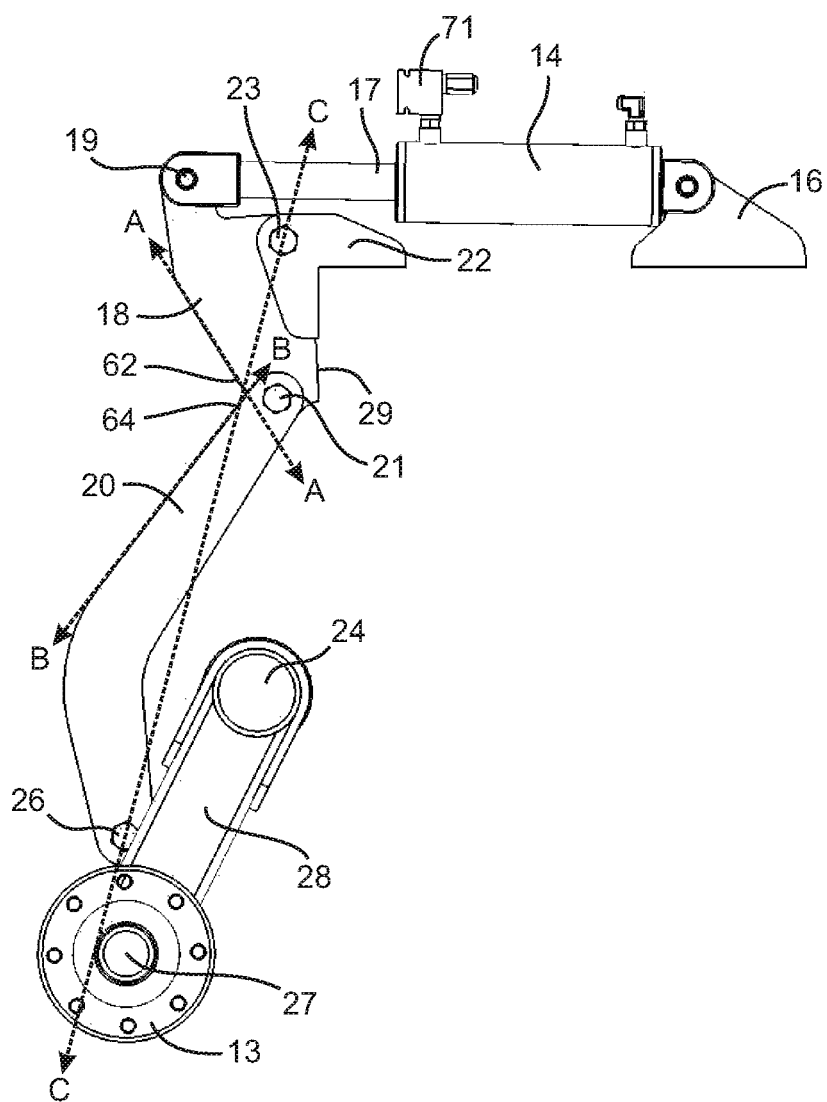
FIG. 9 depicts a side view of an over-center locking linkage arrangement connecting an implement-elevation hydraulic cylinder to wheels when the land roller is in the transport configuration.

With particular reference to FIG. 8A and FIG. 9, when the land roller 1 is in the transport position, the wheels 12 (shown in dashed line in FIG. 8A to illustrate structures behind the wheels 12) are in the ground-engaging position and the struts 28 depend from the lift axle 24 in a downward and rearward orientation. In the transport configuration, the frames 10, 30, 50 remain raised with the rollers 11, 31, 51 in the ground-disengaged position. The land roller 1 is locked in the transport configuration because abutment of an anterior edge 29 of the first linkage 18 against the vertical frame member 9 of the center frame 10 prevents the first linkage 18 from pivoting counterclockwise, which in turn prevents further pivoting of the second linkage 20 and thus prevents further pivoting of the wheels 12. Because the first, second and fourth pivot points 19, 21, 26, respectively, form a triangle with the second pivot point 21 forward of a line C-C between the third pivot point 23 and the fourth pivot point 26, representing an arrangement of the linkage assembly to one side of a center formed by the line C-C, the weight of the land roller 1 itself helps hold the anterior edge 29 of the first linkage 18 against the vertical frame member 9 of the center frame 10 thereby discouraging clockwise pivoting of the first linkage 18. Also, because the first, second and fourth pivot points 19, 21, 26, respectively, form a triangle, a line A-A along a posterior edge 62 of the first linkage 18 proximate the second pivot point 21 forms an acute posterior angle with a line B-B along a posterior edge 64 of the second linkage 20 proximate the second pivot point 21. Thus, the weight of the land roller 1 itself helps lock the land roller 1 in the transport configuration in addition to the force applied by the hydraulic cylinder 14.

With particular reference to FIG. 8A, FIG. 8B, FIG. 8C, FIG. 8D and FIG. 9, to convert the land roller 1 from the transport configuration to the working configuration, retraction of the cylinder rod 17 causes the first pivot point 19 to translate forwardly (to the right in FIG. 9) causing the first linkage 18 to pivot clockwise about the third pivot point 23, the third pivot point 23 remaining stationary because the mounting plate 22 is rigidly connected to the center frame 10. Clockwise pivoting of the first linkage 18 causes counterclockwise pivoting of the second linkage 20, which in turn initially causes counterclockwise rotation of the lift axle 24. Counterclockwise rotation of the lift axle 24 causes the struts 28 to initially pivot to a more vertical orientation, thereby lifting the center frame 10 and the entire land roller 1 higher off the ground. Counterclockwise pivoting of the second linkage 20 causes the second pivot point 21 to translate rearward toward the line C-C between the third pivot point 23 and the fourth pivot point 26 (the fourth pivot point 26 shown as a dashed circle behind the wheel 12 in FIG. 8B, FIG. 8C and FIG. 8D). Thus, the sum of the distance between the first and second pivot points 19, 21, respectively, and the distance between the second and fourth pivot points 21, 26, respectively, approaches the distance between the first and fourth pivot points 19, 26, respectively. When the third, second and fourth pivot points 23, 21, 26, respectively, all become aligned along line C-C between the third pivot point 23 and the fourth pivot point 26, the sum of the distance between the first and second pivot points 19, 21, respectively, and the distance between the second and fourth pivot points 21, 26, respectively, equals the distance between the first and fourth pivot points 19, 26, respectively. At this point the first and second linkages 18, 20, respectively, are over center. Further retraction of the cylinder rod 17 causes the second pivot point 21 to pass rearward of the line C-C, which causes the sum of the distance between the first and second pivot points 19, 21, respectively, and the distance between the second and fourth pivot points 21, 26, respectively, to once again become greater than the distance between the first and fourth pivot points 19, 26, respectively (see FIG. 8B). The counterclockwise rotation of the second linkage 20 then causes clockwise rotation of the lift axle 24, which causes the struts 28 to pivot towards a horizontal orientation (see the sequence of FIG. 8B to FIG. 8C to FIG. 8D), and as the struts 28 become horizontal, the center frame 10 lowers.

Also, because the second pivot point 21 translates in an arcuate path about the third pivot point in response to retraction of the hydraulic cylinder 14, the posterior angle between the line A-A along a posterior edge 62 of the first linkage 18 and the line B-B along a posterior edge 64 of the second linkage 20 becomes less acute and starts to approach 180°. The lines A-A and B-B become collinear or parallel or close to collinear or parallel when the first, second and fourth pivot points 19, 21, 26, respectively, become aligned at the over center point. Continued retraction of the cylinder rod 17 causes the second pivot point 21 to further travel arcuately clockwise so that the posterior angle between the line A-A along a posterior edge 62 of the first linkage 18 and the line B-B along a posterior edge 64 of the second linkage 20 becomes obtuse (FIG. 8B, FIG. 8C, FIG. 8D), with the second pivot point 21 rearward of the line C-C.

At some point during the retraction of the cylinder rod 17, the center roller 10, as well as the side rollers 31, 51 if the side rollers 31, 51 are in the unfolded position, is lowered sufficiently to contact the ground to begin supporting the weight of the land roller 1. Once the second pivot point 21 is rearward of the line C-C, the weight of the land roller 1 can no longer be supported against the vertical frame member 9 of the center frame 10, but by this time the center roller 11 is in the ground-engaging position so the hydraulic cylinder 14 does not need to be solely responsible for supporting the weight of the land roller 1. At the same time or at a time after the center roller reaches the ground-engaging position, the wheels 12 completely lift off the ground. By the time the cylinder rod 17 is fully retracted (FIG. 8D), the center roller 11 is in the ground-engaging position and the wheels 12 have pivoted rearward and upward completely into the ground-disengaged position with the struts 28 oriented horizontally to bring the land roller 1 into the working configuration.

With the land roller 1 in the working configuration, extending the cylinder rod 17 reverses the movements to convert the land roller 1 to the transport configuration.

With the land roller 1 in the transport configuration as depicted in FIG. 8A and FIG. 9, in the event of a failure of the hydraulic cylinder 14, the arrangement of the linkage assembly permits the weight of the land roller 1 to be supported by the vertical frame member 9 of the center frame 10, requiring significant upward forces to overcome the weight of the land roller 1 to effect clockwise pivoting of the first linkage 18. While the arrangement of the linkage assembly in the transport configuration of the land roller 1 enhances safety by not requiring pins to be inserted to support the land roller 1 in the transport configuration, such pins may still be employed to further enhance safety, and the linkage arrangement makes the operation of inserting such pins safer than on prior art land roller implements.

Figure 10A:
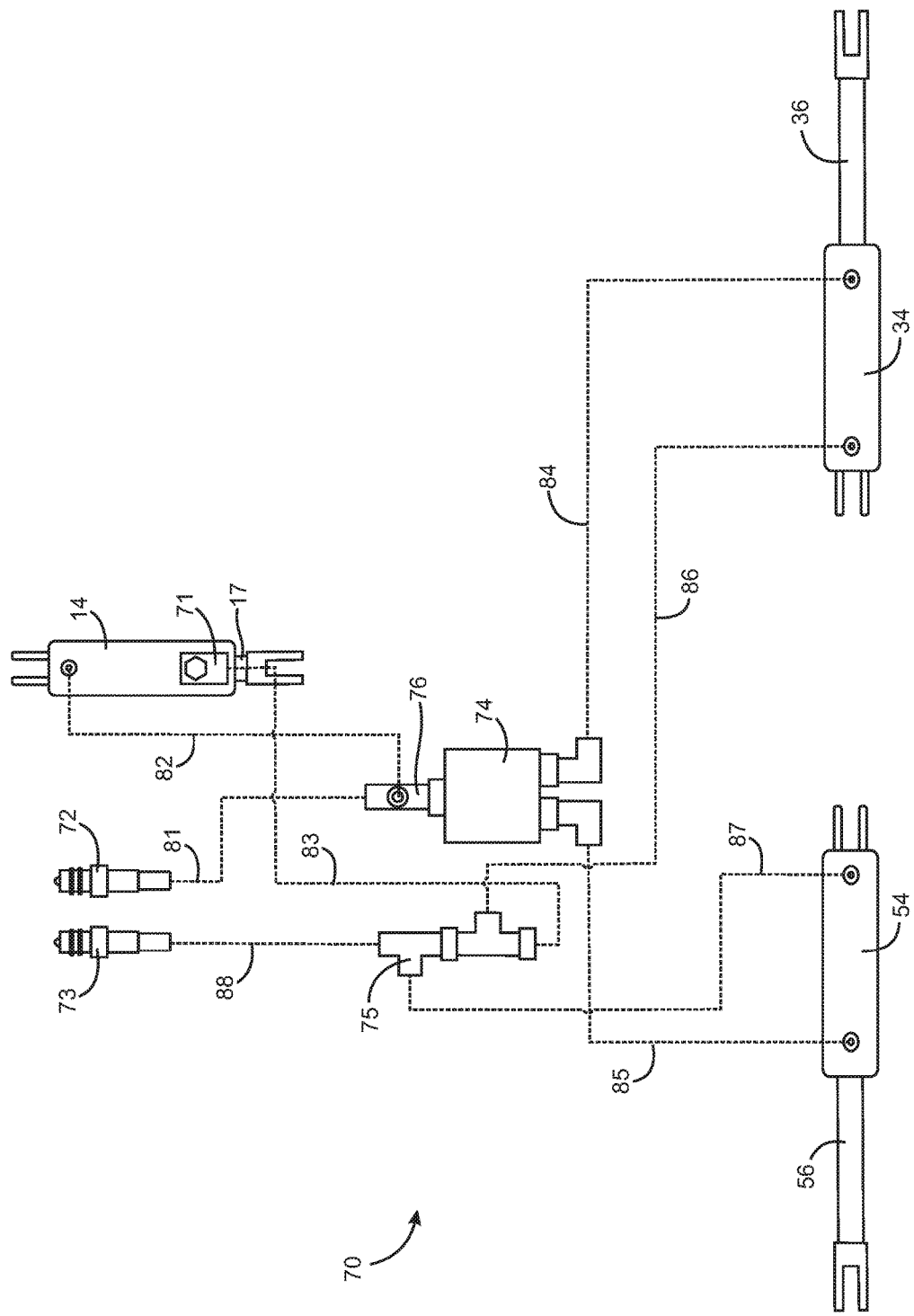
FIG. 10A depicts a hydraulic circuit diagram for a hydraulic system of the land roller in a working configuration.
Figure 10B:
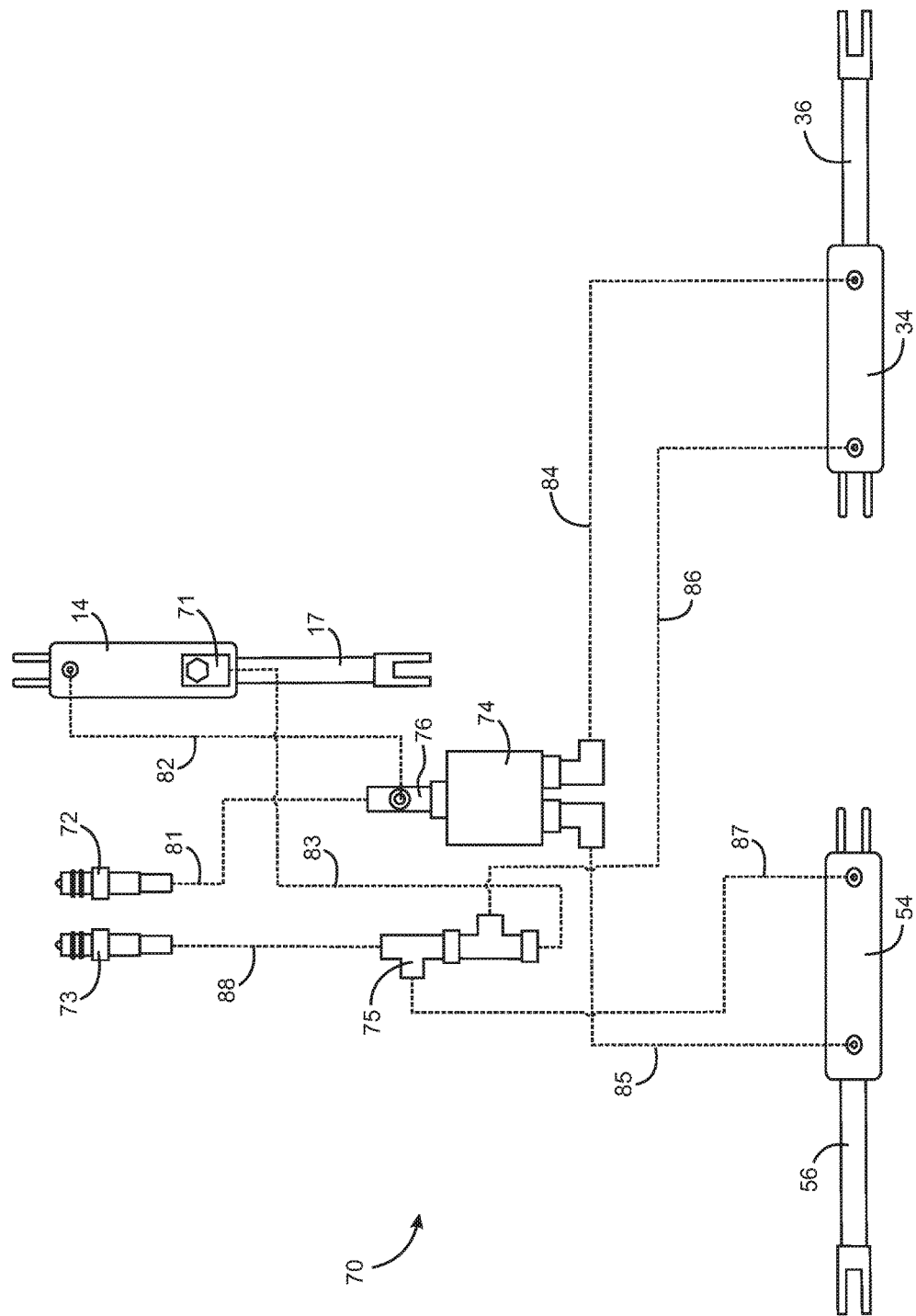
FIG. 10B depicts the hydraulic circuit diagram of FIG. 10A when the land roller is in a transport configuration with right and left side sections in unfolded positions.
Figure 10C:
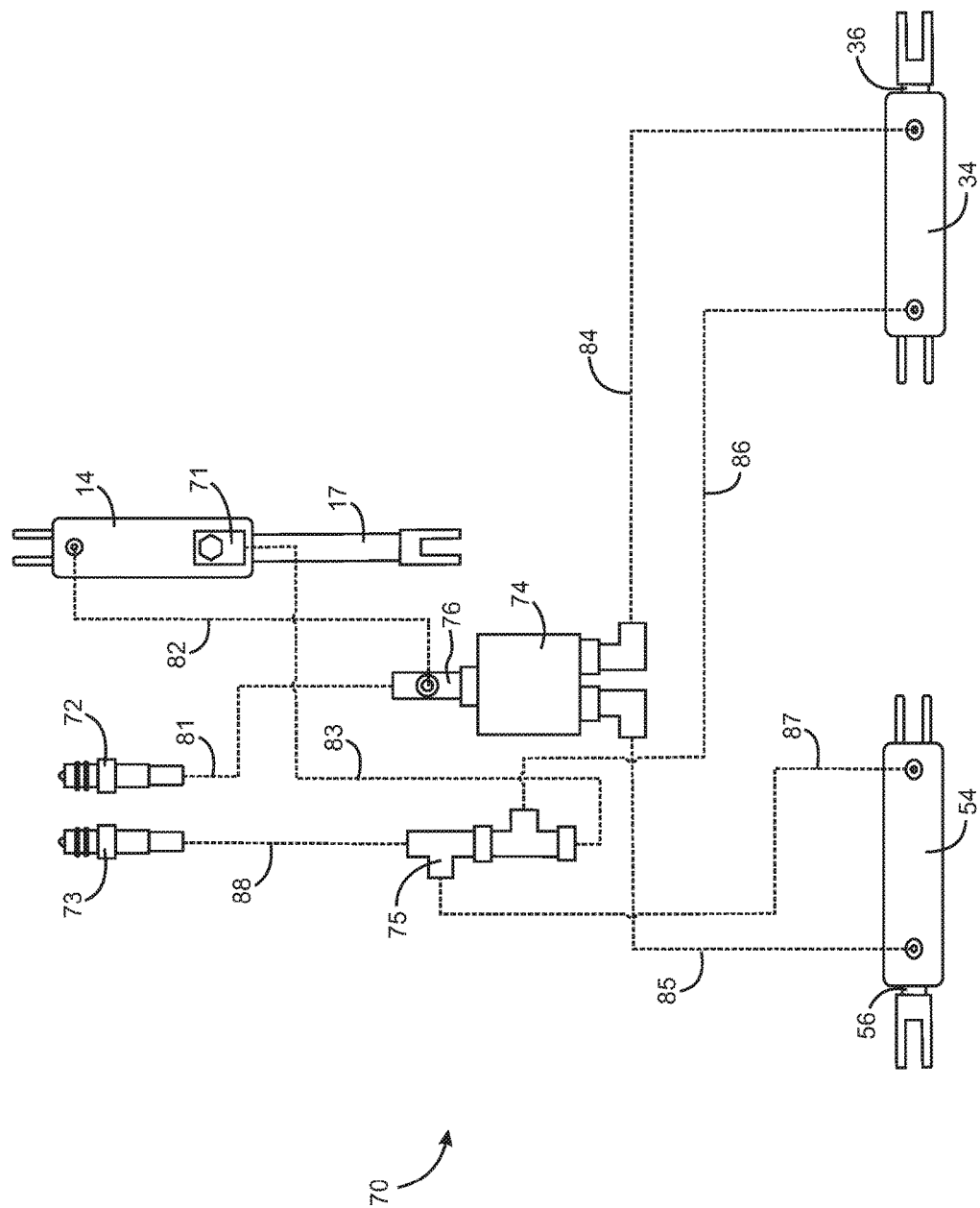
FIG. 10C depicts the hydraulic circuit diagram of FIG. 10A when the land roller is in a transport configuration with right and left side sections in folded positions.

FIG. 10A, FIG. 10B and FIG. 10C depict hydraulic circuit diagrams for a hydraulic system 70 of the land roller 1. The hydraulic system 70 may comprise the implement-elevation hydraulic cylinder 14, the right side hydraulic cylinder 34 and the left side hydraulic cylinder 54 hydraulically connected to a common hydraulic fluid reservoir (not shown) through hydraulic line connectors 72, 73. Delivery of hydraulic fluid pressure from the reservoir through hydraulic line connector 72 or hydraulic line connector 73 may be selected by actuation of a single actuating device, for example a single lever, that may be actuated from a cab of a towing vehicle (e.g. a tractor). The hydraulic system 70 may further comprise a pressure relief valve 71 on a rod-side port of the implement-elevation hydraulic cylinder 14, a 50/50 fluid flow splitter 74, a T-block 75, T-joint 76 and a plurality of hydraulic fluid lines 81, 82, 83, 84, 85, 86, 87, 88 (shown in dashed lines) connecting the various elements of the hydraulic system 70.

FIG. 10A depicts the hydraulic system 70 when the land roller 1 is in the working configuration. In FIG. 10A, the cylinder rod 17 of the implement-elevation hydraulic cylinder 14 is fully retracted, and the cylinder rods 36, 56 of the right and left side hydraulic cylinders 34, 54, respectively, are fully extended. FIG. 10B depicts the hydraulic system 70 when the land roller 1 is in the transport configuration with the right and left side frames in the unfolded position. In FIG. 10B, the cylinder rod 17 of the implement-elevation hydraulic cylinder 14 is fully extended, and the cylinder rods 36, 56 of the right and left side hydraulic cylinders 34, 54, respectively, are also fully extended. FIG. 10C depicts the hydraulic system 70 when the land roller 1 is in the transport configuration with the right and left side frames in the folded position. In FIG. 10C, the cylinder rod 17 of the implement-elevation hydraulic cylinder 14 is fully extended, and the cylinder rods 36, 56 of the right and left side hydraulic cylinders 34, 54, respectively, are fully retracted.

To convert the land roller 1 between the working configuration (FIG. 10A) and the transport configuration with right and left side frames folded (FIG. 10C), the land roller 1 passes through the transport configuration with right and left side frames unfolded (FIG. 10B).

Starting with the land roller in the working configuration (FIG. 10A), the hydraulic line at the hydraulic line connector 72 may be pressurized with hydraulic fluid so that hydraulic fluid flows into the line 81 to the T-joint 76. Hydraulic fluid then flows both into the line 82 and into the 50/50 splitter 74. Hydraulic fluid flowing in the line 82 flows into a barrel-side port of the hydraulic cylinder 14 forcing the cylinder rod 17 to extend thereby forcing the wheels of the land roller 1 into the ground-engaging position raising the center frame off the ground to achieve the transport configuration illustrated in FIG. 10B. Hydraulic fluid in the splitter 74 is divided equally into two streams, one stream flowing into the line 84 and the other into the line 85. The lines 84, 85 lead to rod-side ports on the right and left side hydraulic cylinders 34, 54, respectively. While the cylinder rod 17 is extending, there is not enough hydraulic fluid pressure in the system 70 to overcome the torque that the right and left side frames are placing on the cylinder rods 36, 56 of the right and left side hydraulic cylinders 34, 54, respectively. The torque experienced by the cylinder rods 36, 56 arises, at least in part, from a combination of the weight of the right and left side frames and the geometry of where the left side hydraulic cylinders 34, 54 are mounted on the center frame and the right and left side frames. Lifting the center frame is thus easier than lifting the right and left side frames; therefore the cylinder rods 36, 56 do not start to retract while the cylinder rod 17 is extending. Once the cylinder rod 17 is fully extended, the cylinder rod 17 dead-heads and the pressure begins to spike in the system 70. When the pressure in the system 70 spikes sufficiently, the cylinder rods 36, 56 begin to retract. Once the cylinder rods 36, 56 are fully retracted (FIG. 10C), the right and left side frames have achieved the folded position. Hydraulic fluid flows out of the hydraulic cylinder 14 through the line 83 to the T-block 75 where the fluid flow is joined with hydraulic fluid flowing from the right and left side hydraulic cylinders 34, 54 through the lines 86, 87, respectively. Hydraulic fluid then flows from the T-block 75 through the line 88 out through the hydraulic line connector 73 and back to the reservoir.

Hydraulic fluid flow may be reversed to convert the land roller from the transport configuration with right and left side frames in the folded position (FIG. 10C) to the working configuration (FIG. 10A). With the land roller from the transport configuration with right and left side frames in the folded position (FIG. 10C), the hydraulic line connector 73 may be pressurized with hydraulic fluid so that hydraulic fluid flows into the line 88 to the T-block 75. From the T-block 75, hydraulic fluid flows through the lines 86, 87 to barrel-side ports on the right and left side hydraulic cylinders 34, 54, respectively, causing the cylinder rods 36, 56 to extend. Extension of the cylinder rods 36, 56 causes the right and left side frames to unfold to achieve the transport configuration illustrated in FIG. 10B. Hydraulic fluid also flows from the T-block 75 through the line 83 to the rod-side port on the implement-elevation hydraulic cylinder 14. However, the rod-side port on the implement-elevation hydraulic cylinder 14 is equipped with the pressure relief valve 71, which provides a back pressure into the line 83. The pressure relief valve 71 is configured to open only when the pressure in the system 70 exceeds a pre-determined value. While the cylinder rods 36, 56 of the right and left side hydraulic cylinders 34, 54, respectively, are extending, the back pressure caused by the pressure relief valve 71 is sufficient to prevent hydraulic fluid flow into the hydraulic cylinder 14. Therefore, the right and left side frames achieve the unfolded position before the land roller is lowered into the working configuration. Once the cylinder rods 36, 56 are fully extended, the cylinder rods 36, 56 dead-head and the pressure begins to spike in the system 70. When the pressure in the system 70 exceeds the pre-determined value, the pressure relief valve 71 opens to permit hydraulic fluid to flow into the hydraulic cylinder 14 thereby causing the cylinder rod 17 to retract lowering the land roller into the working configuration when the cylinder rod 17 is fully retracted (FIG. 10A). Hydraulic fluid flows out of the hydraulic cylinder 14 through the line 82 to the T-joint 76 where the fluid flow is joined with hydraulic fluid flowing from the right and left side hydraulic cylinders 34, 54 through the lines 84, 85, respectively, and through the splitter 74. Hydraulic fluid then flows from the T-joint 76 through the line 81 out through the hydraulic line connector 72 and back to the reservoir.

Figure 11A:
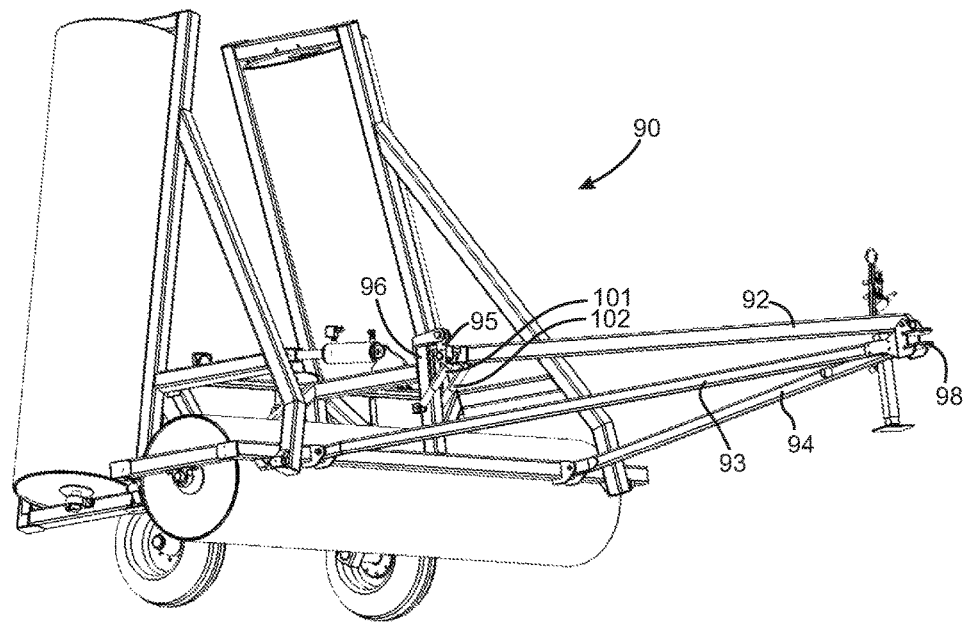
FIG. 11A depicts a front perspective view of a land roller equipped with shock absorbers between a tow bar and a center frame; and, FIG. 11B depicts a magnified view of the shock absorbers on the land roller of FIG. 11A.
Figure 11B:
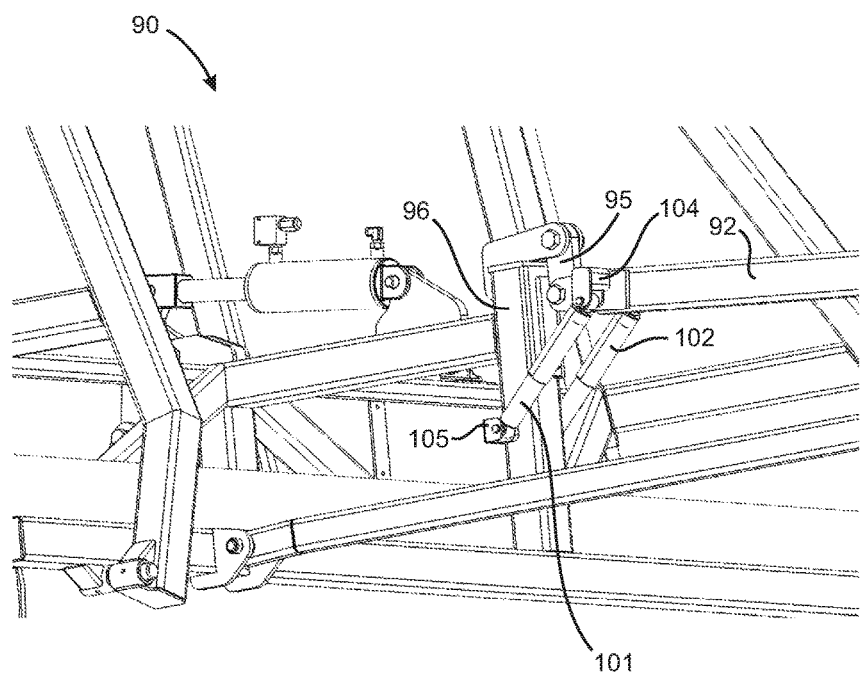

Referring to FIG. 11A and FIG. 11B, in another embodiment, a land roller 90 is generally the same as the land roller 1 of FIG. 1A except that the land roller 90 is equipped with two shock absorbers 101, 102 connected between a longitudinally extending elongated central tow bar 92 and a vertically oriented frame member 96 of a center frame of the land roller 90, the central tow bar 92 also mounted on the frame member 96 by a tow bar pivot mount 95. The land roller 90 also comprises right and left tow bars 93, 94, respectively, with all three tow bars 92, 93, 94 joined at a hitch 98 at a front of the land roller 90. The shock absorbers 101, 102 may be pivotally mounted to the frame member 96. For example, shock absorber pivot mount 104 may be mounted on the central tow bar 92 while shock absorber pivot mount 105 may be mounted on the frame member 96, with the shock absorber 101 pivotally mounted to both shock absorber pivot mounts 104, 105 by pins. A similar arrangement may be used with the shock absorber 102. The shock absorbers 101, 102 are particularly useful to absorb vertical forces while the land roller 90 is towed to reduce vertical displacement of the land roller 90 especially when being towed over rough surfaces.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A land roller comprising:
a frame comprising a first frame section mountable on a transport vehicle for towing the land roller and a side frame section pivotally mounted on the first frame section, the side frame section pivotable between an unfolded position and a folded position;
a first roller mounted on the first frame section;
a second roller mounted on the side frame section;
at least one transport wheel pivotally mounted on the first frame section, the at least one transport wheel pivotable between a ground-engaging wheel position and a ground-disengaged wheel position for conversion of the land roller between a transport configuration and a working configuration, the transport configuration having the at least one wheel in the ground-engaging wheel position and the first and second rollers in ground-disengaged roller positions, the working configuration having the at least one wheel in the ground-disengaged wheel position and at least the first roller in a ground-engaging roller position;
a first actuator connecting the first frame section to the at least one transport wheel, the first actuator operable to pivot the at least one wheel between the ground-engaging wheel position and the ground-disengaged wheel position;
an over-center locking linkage arrangement connected between the first actuator and the at least one wheel, the first actuator configured to transmit force through the over-center locking linkage arrangement to the at least one transport wheel to pivot the at least one wheel; and,
a second actuator connecting the first frame section to the side frame section, the second actuator operable to pivot the side frame section between the unfolded and folded positions, the side frame section pivoting about a side-frame pivot axis when pivoting between the unfolded and folded positions, the second actuator connected to the side frame section at a connection point on the side frame section, the connection point disposed outward of the side-frame pivot axis when the side frame section is in the unfolded position and inward of the side-frame pivot axis when the side frame section is in the folded position.

2. The land roller according to claim 1, wherein the over-center locking linkage arrangement comprises a first linkage and a second linkage, the first linkage pivotally connected to the first actuator at a first pivot point, the first linkage pivotally connected to the second linkage at a second pivot point, the first linkage pivotally connected to the first frame section at a third pivot point disposed between the first and second pivot points, the second linkage pivotally linked to a wheel lifting structure at a fourth pivot point, the second pivot point disposed to one side of a line between the first and fourth pivot points when the land roller is in the transport configuration, the second pivot point disposed to the other side of the line between the first and fourth pivot points when the land roller is in the working configuration.

3. The land roller according to claim 2, wherein the first linkage is pivotally connected to the first frame section at a bracket rigidly mounted to the first frame section, and the third pivot point does not translate when the first and second linkages pivot.

4. The land roller according to claim 2, wherein the second pivot point translates in an arcuate path about the third pivot point in response to operation of the first actuator.

5. The land roller according to claim 2, wherein the at least one wheel is mounted on the wheel lifting structure, wherein the wheel lifting structure comprises a transversely oriented axle bar, an axis of rotation of the at least one wheel parallel to but spatially offset from a rotation axis of the axle bar, the axle bar connected to the second linkage and rotating in response to movement of the second linkage to pivot the at least one wheel between the ground-engaging wheel position and the ground-disengaged wheel position, the second linkage movable in response to movement of the first linkage, the first linkage moveable in response to operation of the first actuator.

6. The land roller according to claim 5, wherein the second linkage is connected to the axle bar by a third linkage, the third linkage pivotally connected to the second linkage and rigidly connected to the axle bar.

7. The land roller according to claim 1, wherein the first and second actuators are controlled by a single controller, and the first and second actuators are configured to actuate in temporal series when signaled by the controller to actuate.

8. The land roller according to claim 7, wherein the first actuator pivots the at least one wheel to the ground-engaging wheel position then the second actuator pivots the side frame section to the folded position to convert the land roller to the transport configuration from the working position, and the second actuator pivots the side frame section to the unfolded position then the first actuator pivots the at least one wheel to the ground-disengaged wheel position to convert the land roller to the working configuration from the transport configuration.

9. The land roller according to claim 1, wherein the first actuator, second actuator or both the first and second actuators comprise hydraulic cylinders.

10. The land roller according to claim 7, wherein the first and second actuators comprise hydraulic cylinders operated from a common hydraulic fluid reservoir through a common hydraulic circuit, the hydraulic circuit comprising a pressure relief circuit in fluid communication with the first and second actuators, the pressure relief circuit preventing hydraulic fluid from flowing into the first actuator when hydraulic fluid pressure in the common hydraulic circuit is less than a pre-determined value and permitting hydraulic fluid to flow into the first actuator when hydraulic fluid pressure in the common hydraulic circuit reaches or exceeds the pre-determined value.

11. The land roller according to claim 1, wherein the connection point for the second actuator on the side frame section is configured to permit translation of the actuator within the connection point to permit the side frame section to move relative to the first frame section during operation of the land roller.

12. The land roller according to claim 1, wherein the connection point for the second actuator on the side frame section comprises a pin in an elongated slot to permit translation of the actuator within the connection point to permit the side frame section to move relative to the first frame section during operation of the land roller.

13. The land roller according to claim 1, wherein the at least one wheel comprises two transversely spaced-apart wheels.

14. The land roller according to claim 1, wherein the land roller comprises two side frame sections, one disposed on a left side of a longitudinal center line through the first frame section and one disposed on a right side of the longitudinal center line through the first frame section.

15. A land roller according to claim 1, further comprising a longitudinally extending tongue configured to be mounted on a transport vehicle, and at least one shock absorber mounted between the tongue and the frame.

16. The land roller according to claim 15, wherein the at least one shock absorber comprises two shock absorbers pivotally mounted to the tongue and the frame.

* * * * *